W. D. Chapman,
Fish Hook,
Nº 54,684. Patented May 15, 1866.
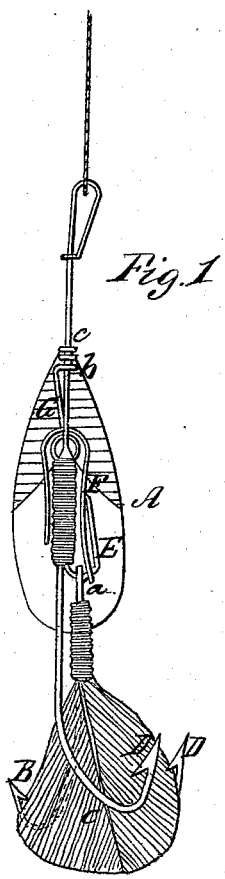
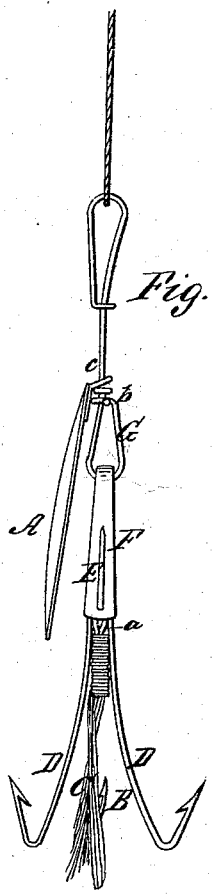

UNITED STATES PATENT OFFICE.

W. D. CHAPMAN, OF THERESA, NEW YORK.

IMPROVEMENT IN FISHING-TACKLE.

Specification forming part of Letters Patent No. 54,684, dated May 15, 1866.

*To all whom it may concern:*

Be it known that I, W. D. CHAPMAN, of Theresa, in the county of Jefferson and State of New York, have invented a new and useful Improvement in Fish-Hooks; and I do hereby declare that the following is a full, clear, and exact description thereof, which will enable those skilled in the art to make and use the same, reference being had to the accompanying drawings, forming part of this specification.

The present invention relates particularly to "trolling fish-hooks," so called, although it can be readily applied to other hooks; and it consists in a novel manner of hanging a hook containing the fly or other bait to one or more hooks, whereby, when so desired, it can be easily detached therefrom, and a hook adapted for another and different kind of bait—as, for instance, for minnows or frogs, &c.—applied or hung on them, as will be apparent from the following detail description thereof, reference being had to the accompanying plate of drawings, in which—

Figure 1 is a view of one side of a trolling fish-hook having a hook hung on it according to the present invention; Fig. 2, a similar view to Fig. 1, but of a different and another side.

A in the drawings represents a trolling-hook, the general arrangement of which is the same as in similar hooks, except so far as the present invention extends, a hook, B, having a "fly-bait," C, so called, being used in connection with the two principal hooks D D, fastened together at their upper ends in any proper manner, with a small wire hook, E, on which the eye *a* of the fish-hook B, before referred to, is hung, and there secured by a spring-hook, F, one end of which fits over the fixed wire hook E of the fish-hook, and at its other interlocks with the lower portion of the snood G, for which purpose the snood is sprung open or unfastened by its catch *b* from the main or shank portion *c* of the snood.

From the above description it is obvious that when desired to change the fly-hook for a hook adapted to the reception of other baits—such as, for instance, minnows, frogs, &c.—it is only necessary to spring open the snood, which leaves the spring-hook F free to be disengaged therefrom, and also to be removed from the wire hook E of the fish-hook, when the eye of the fly-bait hook can be readily slipped off and another hook substituted, when the spring-hook and snood are secured together and to the wire hook E, as before explained.

I claim as new and desire to secure by Letters Patent—

The combination of the fixed wire hook E, spring-hook F, and snood G, when arranged together and so as to operate substantially in the manner described, and for the purpose specified.

W. D. CHAPMAN.

Witnesses:
    J. M. GRENELL,
    P. B. SALISBURY.